L. S. HACKNEY.
TRACTION VEHICLE.
APPLICATION FILED JULY 27, 1914.

1,230,402.

Patented June 19, 1917.
2 SHEETS—SHEET 2.

Witnesses
F. C. Caswell
Willis C. Otis

Inventor
Leslie S. Hackney
by John E. Stryker
Atty.

UNITED STATES PATENT OFFICE.

LESLIE S. HACKNEY, OF ST. PAUL, MINNESOTA.

TRACTION-VEHICLE.

1,230,402. Specification of Letters Patent. Patented June 19, 1917.

Application filed July 27, 1914. Serial No. 853,300.

*To all whom it may concern:*

Be it known that I, LESLIE S. HACKNEY, a citizen of the United States, residing at St. Paul, in the county of Ramsey and State of Minnesota, have invented new and useful Improvements in Traction-Vehicles, of which the following is a specification.

Its object is to provide a simple, durable and efficient traction vehicle adapted to prevent unnecessary packing or gouging of the soil.

More particularly it is my object to provide a device of this kind having the greater part of its weight carried by a single caterpillar tread, said tread being held against lateral tipping movements and guided by a combination balancing and steering device attached thereto.

Figure 1:
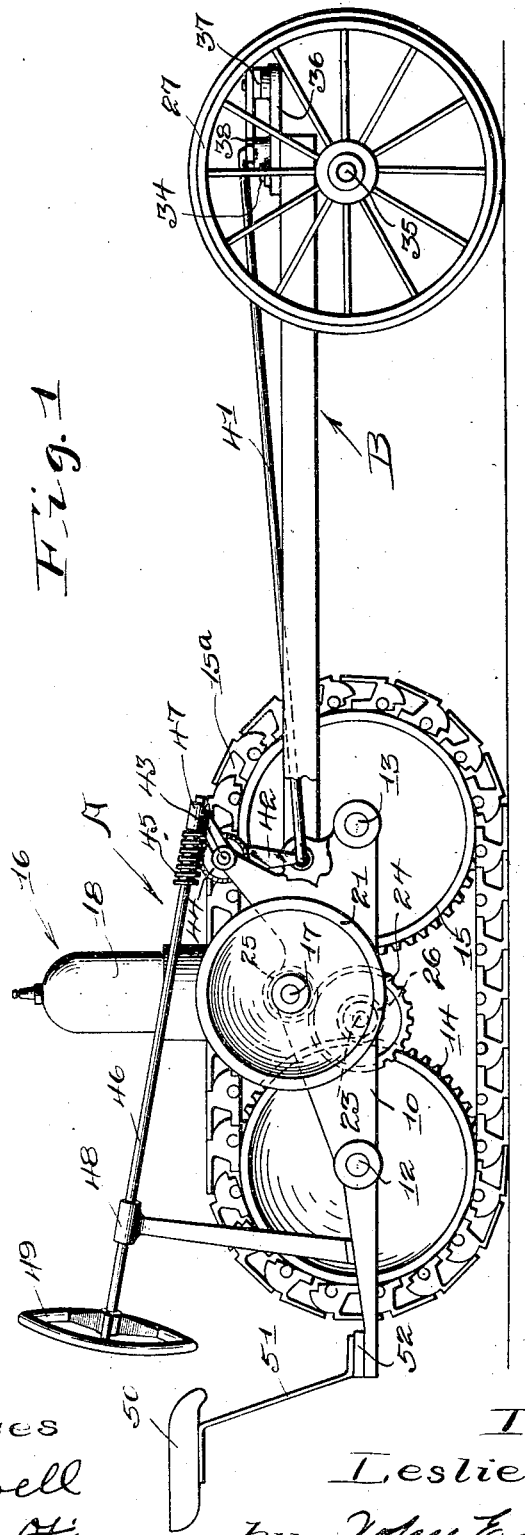
Figure 2:
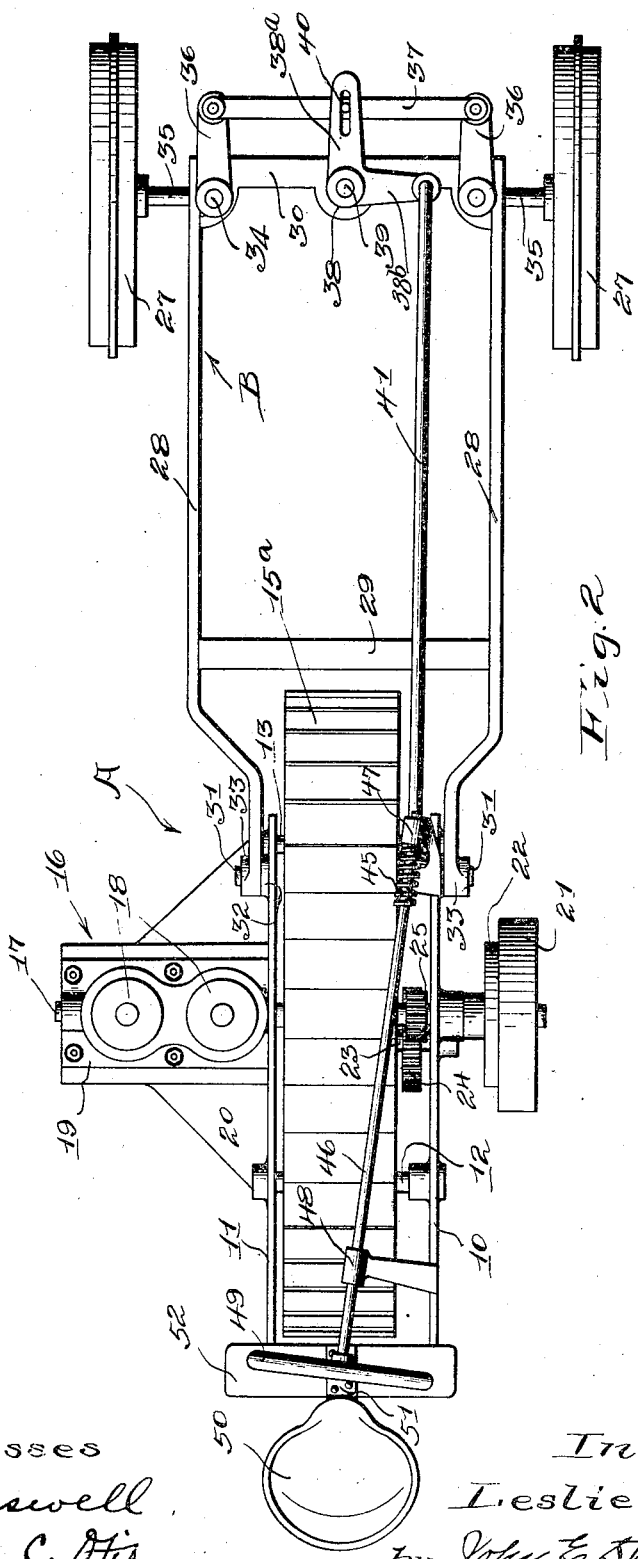

In the drawings Figure 1 is a side elevation of my improved traction vehicle and Fig. 2 is a plan view of the same.

Referring to the accompanying drawings, I have used the reference letter A to indicate the traction carriage and B the balancing and steering frame therefor. The traction carriage consists of side beams 10 and 11 in which the shafts 12 and 13 are journaled. A driving sprocket wheel 14 and an idler sprocket wheel 15 are respectively mounted upon said shafts 12 and 13 between the side beams 10 and 11. An endless flexible tread 15$^a$, preferably of the non-sagging type, suitably geared upon its inner side, meshes with said sprocket wheels 14 and 15 and travels upon the peripheries of said wheels. An internal combustion engine 16 is furnished to rotate the sprocket wheel 14 and drive said flexible tread. The crank shaft 17 of said engine is journaled transversely in the side beams 10 and 11, the cylinders 18, crank case 19 and pistons (not shown) being arranged on the outside of the beam 11 and supported upon the bracket 20 thereon, while the fly-wheel 21 and change gear mechanism 22 are arranged on said shaft on the opposite side of beam 10.

The counter shaft 23 journaled in the side beams 10 and 11 carries a spur gear 24, meshing with the gear wheel 25 of said change gear mechanism 22, and also carries a second gear wheel 26 (indicated by dotted lines in Fig. 1) which meshes with the teeth of the driving sprocket wheel 14. This self contained traction carriage is supported upon the single tractor tread 15$^a$ which carries the entire weight of the structure and distributes the same over a considerable area upon the ground surface.

A balancing and steering device is provided to prevent the carriage A from falling to one side or the other and to direct its course of travel. This device consists of a wide frame B having steering wheels 27 knuckled or swiveled on opposite sides at the forward end thereof, said frame being attached to the carriage A and adapted to oscillate vertically with respect thereto.

The frame B consists of side rails 28 joined by an intermediate and a forward cross bar 29 and 30. These side rails 28 are connected at their rear ends to the side beams 10 and 11 of the carriage A by heavy pins 31 which pass through large bearings 32 on said beams and through bearings 33 on said side rails 28.

A pair of L shaped axles 34, each carrying a steering wheel 27 on its horizontal branch 35, have their vertical branches journaled in opposite ends of the cross bar 30 of the frame B. Forwardly projecting arms 36 secured to the upper ends of said vertical branches are pivotally connected by the link bar 37 which secures said wheels in the same relation and moves one simultaneously with the other. A bell-crank 38 turns horizontally upon the pin 39 in the cross bar 30 of said frame B and one of its arms 38$^a$ has a slotted pivotal connection as at 40 with the link bar 37. The other arm 38$^b$ of said bell-crank 38 is pivotally connected with one end of the push rod 41, which also is pivoted at its other end in the steering arm 42 on the carriage A. This steering arm 42 is suspended from a stub shaft 43 in the side beam 10 of the carriage. The point of connection between said steering arm 42 and push rod 41 is arranged to rest in the axis of the pins 31 connecting said carriage A and frame B, when the steering wheels 27 are directed straight ahead, to minimize undesirable deflection of said wheels as the same rise and fall.

The steering arm 42 is attached to the worm wheel 44 journaled upon the stub shaft 43. This worm wheel meshes with a worm 45 on the steering shaft 46, said shaft being revolubly supported in the bearings 47 and 48 on the beam 10 and supplied with a hand wheel 49 for turning the same.

The driver's seat 50 is arranged adjacent to the steering wheel 49 and is mounted upon a spring post 51 secured to the cross plate 52 resting upon the rear extremities of the side beams 10 and 11 of the carriage A.

The tractor tread 15ª and steering wheels 27 form in my device a three point support. The steering wheels, being swiveled on the frame B, rest upon the ground in substantially the same relation with respect to the tread 15ª during all variations in travel. The weight of the driver, the tractive mechanism and a part of the steering frame is carried by the tread and distributed over a large area. It will be noted, therefore, that a very simple and stable tractor is provided and that the weight thereof is distributed to obtain the maximum of efficiency with a minimum disturbance of the soil.

Having described my invention, what I claim as new and desire to protect by Letters Patent, is:

1. In a tractor, a traction carriage comprising a frame, tread supporting wheels on said frame, a flexible caterpillar tread on said wheels, an engine on said frame in operative connection with said tread for driving the same, a driver's seat on the frame, a steering and balancing frame oscillatable vertically on said carriage frame, steering wheels knuckled on said steering frame in positions forward of and at either side of said tread and actuating means accessible from said driver's seat and in operative connection with said steering wheels.

2. In a tractor, a traction carriage comprising a frame, tread supporting sprocket wheels in said frame, a flexible tread geared with and adapted to travel with the peripheries of said sprocket wheels, an engine on the frame geared with one of said wheels, a steering and balancing frame oscillatable vertically on said first mentioned frame, and a pair of guide wheels on said steering frame arranged forward of and on opposite sides of said tread.

3. In a tractor, a traction carriage comprising a frame, a single traction and supporting device for said carriage, a combination steering and balancing frame tiltable vertically upon said carriage frame, wheels on said combination frame, a steering arm on the carriage frame adapted to be manipulated therefrom and a rod pivoted in said steering arm and operatively connected with said wheels for guiding the same, said pivotal connection between said arm and rod being arranged to rest in the rotative axis of said combination frame, when said wheels are directed to guide the carriage in a straight course.

In testimony whereof, I have signed my name to this specification in the presence of two subscribing witnesses.

LESLIE S. HACKNEY.

Witnesses:
F. C. CASWELL,
MAE PETTIGREW.

Copies of this patent may be obtained for five cents each, by addressing the "Commissioner of Patents, Washington, D. C."